Dec. 30, 1941.  J. H. FOX  2,268,247

PROCESS OF MAKING COLORED SHEET GLASS

Filed Dec. 15, 1937  2 Sheets-Sheet 1

INVENTOR.
John H. Fox
BY
ATTORNEYS.

Dec. 30, 1941. J. H. FOX 2,268,247
PROCESS OF MAKING COLORED SHEET GLASS
Filed Dec. 15, 1937 2 Sheets-Sheet 2

INVENTOR.
John H. Fox
BY Bradley & Bee
ATTORNEYS.

Patented Dec. 30, 1941

2,268,247

UNITED STATES PATENT OFFICE 2,268,247

PROCESS OF MAKING COLORED SHEET GLASS

John H. Fox, Pittsburgh, Pa., assignor to Pittsburgh Plate Glass Company, Allegheny County, Pa., a corporation of Pennsylvania Application December 15, 1937, Serial No. 179,815

1 Claim. (Cl. 49—83.1)

Figure 1:
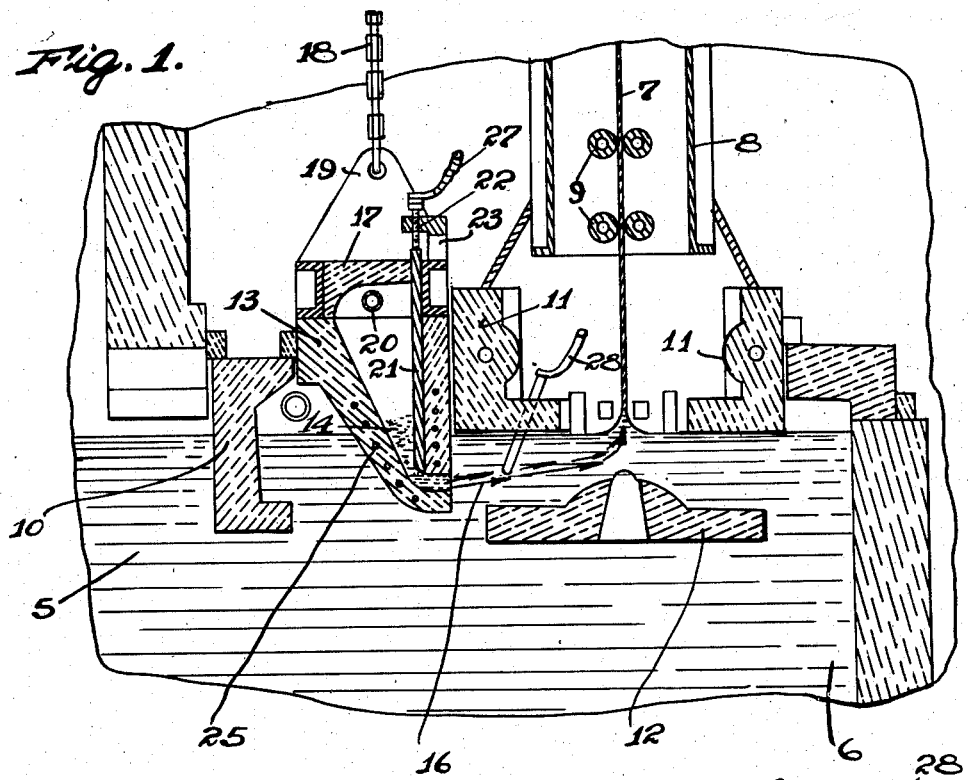
Figure 2:
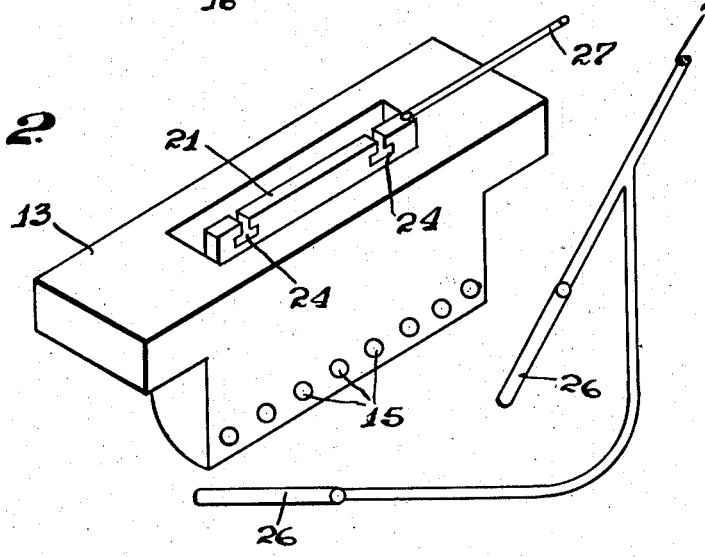
Figure 3:
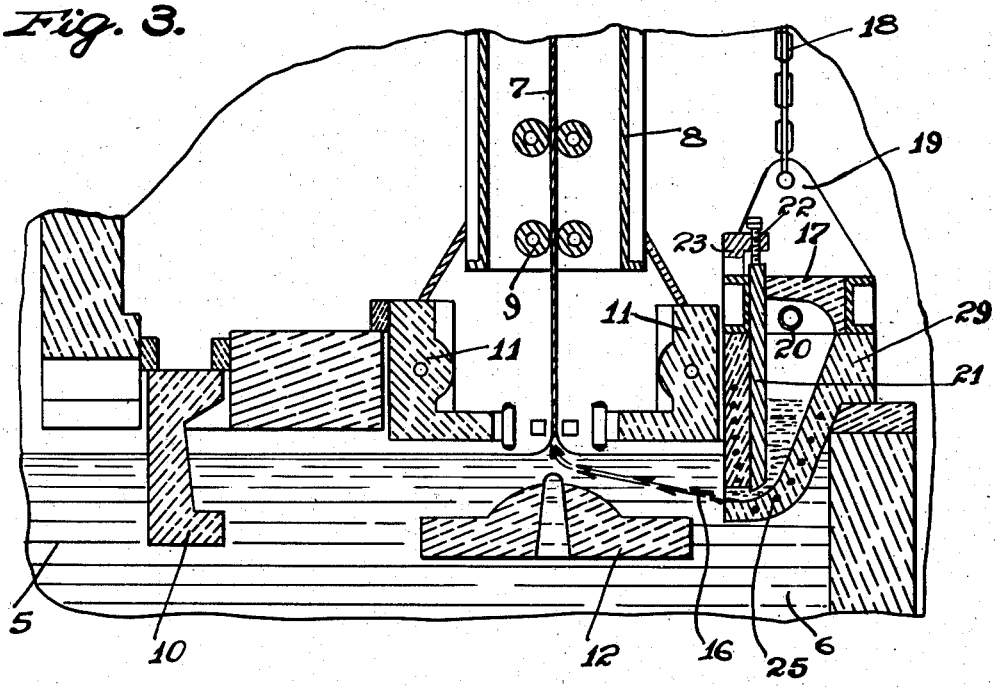
Figure 4:
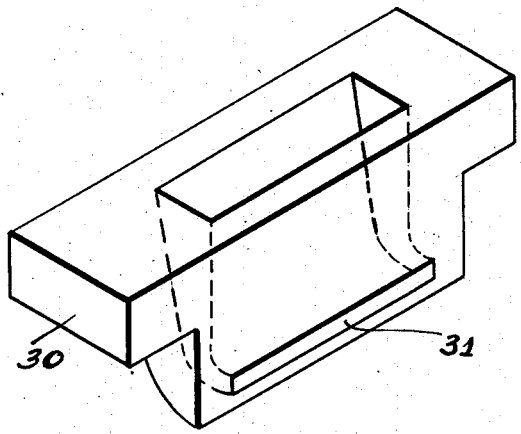

The invention relates to a process whereby a colored glass may be made in an ordinary sheet glass machine, such as that of Slingluff or Colburn, by simple additions thereto permitting the making of ordinary colorless sheet glass when the color supply means are discontinued. It has been proposed heretofore to accomplish this result by feeding either colored glass in molten or powdered form onto the surface of the bath adjacent the line of draw of the sheet, so that a colored layer is supplied to one side of the sheet, the body of the sheet being of clear glass. This two layer glass, known as "flashed glass," has a coating which is relatively thin and transparent, tending in some cases to separate from the body of clear glass, if the two glasses are not exactly "fitted" to each other. The present method has for its objects the provision of a process which will give a sheet colored throughout its thickness, as opposed to the "flashed" or two layer glass, and which shows, with transmitted light, denser color and less transparency. Two forms of the apparatus are shown in the accompanying drawings, wherein:

Figure 1 is a vertical section through the apparatus. Fig. 2 is an isometric view of the hopper which contains the colored glass. Fig. 3 is a section through a modification. And Fig. 4 is an isometric view of a modified form of hopper.

Referring to the drawings, 5 is a melting tank and 6 is a drawing extension or forehearth from which a glass sheet 7 is drawn continuously. The drawing is accomplished by a Fourcault leer well known in the art and comprising a casing 8 and a series of pairs of drawing rolls 9 which grip the sides of the sheet and draw it continuously through the leer to the upper end where it is cut in sections. The usual skim bar 10 is employed between the melting tank and its forehearth and a pair of L-blocks 11 are supported on either side of the line of draw of the sheet, as is common in the art. A draw bar 12 extends transversely of the tank beneath the line of draw and serves to position the line of draw of the sheet and give a somewhat cooler layer of glass from which to draw, in order to increase the drawing speed.

Extending transversely of the tank is a hopper 13 which carries a body of molten colored glass 14, which glass is fed into the body of clear glass below the surface thereof through the line of openings 15 (Fig. 2). These openings are intermediate the level of the upper side of the draw bar and the surface of the glass, and when the glass flows into the forehearth from the hopper, it follows a path somewhat as indicated at 16 and becomes incorporated into the glass sheet 7 providing the desired color in such sheet. This color is mixed through the body of the sheet, and by regulating the flow of material from the hopper, the degree of color in the sheet may be varied to suit requirements. The hopper is filled with a colored glass by ladling from a small tank of colored glass or by a supply from pots of colored glass which are heated in a separate kiln.

The hopper is provided with a suitable cover 17 which is moved into and out of place from an overhead crane by means of a chain 18 connected to brackets 19. This cover prevents the glass from cooling too rapidly and in order to give still further heat, burners may be applied through suitable openings 20 in the cover. The cover also carries the gate 21 for controlling the flow of glass through the openings 15. This gate is of suitable heat resisting metal and is moved up and down by means of a pair of screws 22 threaded through brackets 23 secured to the lid. The lower ends of the screws fit removably in dovetail slots 24 (Fig. 2) in the upper end of the gate. Additional heating means for the hopper may be provided in the form of resistance elements 25 embedded in the walls of the hopper, such elements being connected to a suitable source of current (not shown). An additional heating effect is also secured by means of the electrodes 26, 26 which engage the glass bath and by the lead 27 connected to the gate. The leads 27 and 28 are connected to a suitable source of current supply and the flow of current from the gate to the electrodes 26 heats the glass flowing through the openings 15 and the glass adjacent thereto in the bath. This obviates any danger of the glass freezing up in the openings 15 and serves as an additional means for regulating the flow.

Fig. 3 illustrates a modification in which the hopper 29 is located on the side of the line of draw remote from the melting tank instead of being located on the side thereof adjacent to the melting tank as in the Fig. 1 construction. The details of construction of the hopper are the same as heretofore described and require no further description being similarly numbered. The electrical heating connections for the bath and gate are dispensed with in this particular construction.

Fig. 4 illustrates a hopper 30 which differs from that of Fig. 2 in that no provision is made for electrical heating and the outlet at the lower end is in the form of a slot 31 which takes the place of the series of openings 15 of the first type of construction. This hopper is designed to be used with a gate similar to that shown in Figs. 1 and 2.

What I claim is:

A method of making a glass sheet, which consists in drawing a sheet vertically from the surface of a molten bath of clear glass above a draw bar, feeding molten colored glass into the bath below the surface of the bath above the top of the draw bar through an outlet extending transversely of the bath parallel to and adjacent the line of draw so that the colored glass is incorporated into the sheet throughout its thickness.

JOHN H. FOX.